April 27, 1965 H. J. PETERS 3,180,946

NONSLIP BASE STRUCTURE

Filed June 28, 1961

INVENTOR
H. J. PETERS

BY

ATTORNEY

United States Patent Office 3,180,946
Patented Apr. 27, 1965

3,180,946

NONSLIP BASE STRUCTURE

Henry J. Peters, Summit, N.J., assignor to Bell Telephone Laboratories, Incorporated, New York, N.Y., a corporation of New York Filed June 28, 1961, Ser. No. 120,360
12 Claims. (Cl. 179—147)

Figure 1:
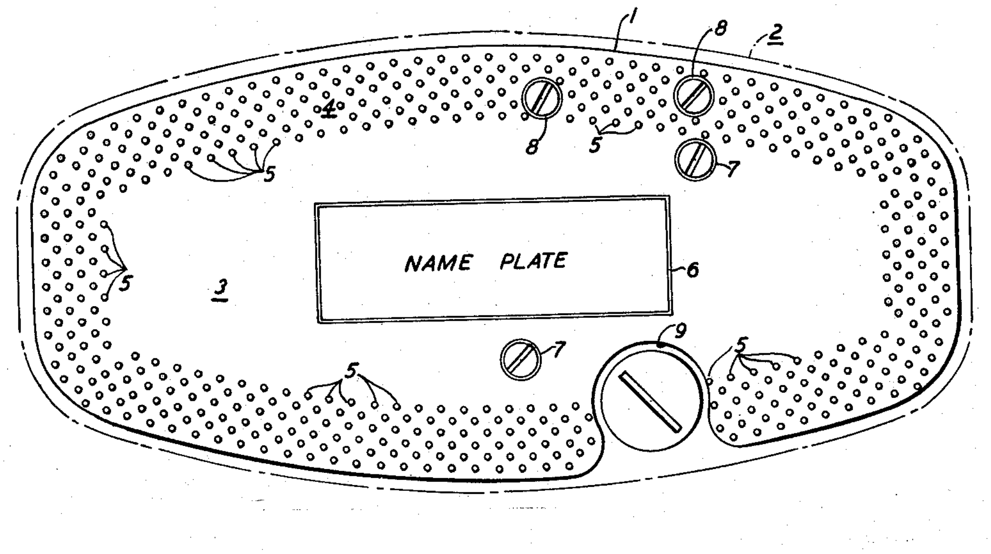

This invention relates to base pads for telephone sets and the like, and more particularly to such pads which are adapted to prevent light-weight telephone sets from sliding during dialing.

At present, telephone sets of the type designed to be placed on a desk or other plane surface usually include individual ringer units which in addition to audibly signifying incoming calls, impart sufficient weight to the sets in which they are housed to prevent appreciable amounts of sliding during dialing. Unfortunately, most ringers having sufficient weight to prevent sliding are relatively bulky and, as such, necessitate a corresponding increase in the size of sets in which they are contained. While sets incorporating these ringers are ideally suited to applications in which size is not a material factor, situations do occasionally arise in which slightly smaller sets are highly preferable.

Although it is perfectly apparent that situating a ringer apart from its associated set would facilitate a corresponding reduction in telephone size, in addition to which the use of a single centrally located ringer in certain applications, a group of extension telephones for example, would result in a substantial economic saving, such an arrangement per se would tend to reinstate the annoying characteristic of sliding which was so successfully overcome by the addition of weight. From the early stages of the telephone art, that is to say before ringers were individually incorporated into subscriber sets, and up to the present time, numerous means alternative to weight alone have been proposed to cope with the problem of sliding. None of these, however, was found entirely satisfactory. As a consequence, although telephone sets which are smaller, more economical, and physically more attractive than their counterparts incorporating individual ringers are deemed highly desirable, the ultimate perfection of such sets entails the development of practical means for preventing sliding during dialing.

Accordingly, it is the principal object of this invention to substantially reduce objectionable sliding which tends to accompany the dialing of light-weight telephone sets.

More specifically, it is an object of the invention to provide a tenacious yet inexpensive base structure for telephone sets or like objects which will both protect the surface upon which such sets rest and at the same time secure them against annoying lateral motion during dialing.

The objects of the invention are accomplished by means of a base structure, connectable to the undersurface of a telephone set, which comprises a multiplicity of resilient protrusions clustered around its perimeter. In a preferred embodiment of the invention, to be more fully described below, the base structure comprises a neoprene pad, substantially coextensive with the base of the set to which it is affixed, having a substantially flat central region and a peripheral region upon which a plurality of rows of truncated feet are molded. When constructed in this manner, the set to which the pad is attached is supported solely by the peripherally disposed feet.

Figure 2:
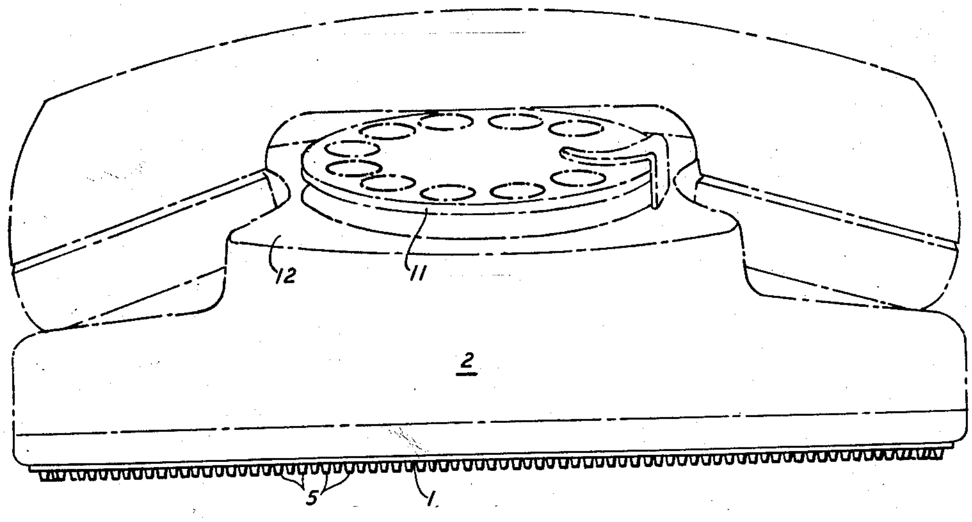

A more thorough understanding of the invention will be derived by reference to the following detailed description of an illustrative embodiment of the invention and the drawing of which:

FIGS. 1 and 2 depict from frontal and side views, respectively, a base pad constructed in accordance with the invention which is affixed to the under surface of a light-weight telephone set.

With reference to the drawing, FIG. 1 illustrates a rubberized pad, constructed in accordance with the principles of the invention, affixed to the base of a light-weight telephone set 2. As shown, the under surface of pad 1 comprises two distinct regions; namely, a flat central region 3 and a peripheral region 4, central region 3 and peripheral region 4 being coplanar except for a multiplicity of protruding feet 5 molded to and extending perpendicularly from the latter. Central region 3, being recessed from the plane formed by the collective set supporting surfaces of feet 5, may contain any number of openings, for example, a name plate slot 6 and screw holes 7, without deteriorating the gripping property of the invention. Peripheral region 4, on the other hand, should preferably have protruding feet 5 distributed uniformly over its surface; however, a few scattered areas devoid of feet, such as screw holes 8 and aperture 9, through which illuminating apparatus for dial and night lighting may be inserted, will not seriously detract from the pad's performance.

The nonslip properties of the invention are attributable in part to a proper selection of the total number of feet constituting the pad, in part to the particular arrangement in which these feet are distributed, and in part to the general shape in which the individual feet are molded. With regard to the first of these factors, it has been observed that as a compressive force exerted on a rubberized foot is increased, the effective coefficient of friction exhibited by that foot correspondingly increases. Consequently, the number of feet comprising the pad is appropriately restricted such that the force exerted by the weight of set 2 when supported by the pad slightly compresses each foot. A sufficient number of feet must be present, however, to provide collectively a large enough frictional surface to exert a counterforce equal to that induced by dialing. By way of example, it was found that on a base pad having a configuration as shown in FIG. 1 and being substantially of composition designated in the table below, approximately 430 truncated feet, each having an approximate length of 0.095 inch, a mean diameter of approximately 0.047 inch, and processed to a standard Shore "A" hardness index of 50 were initially sufficiently compressed by a telephone set weighing approximately 28 ounces (excluding the weight of the handset) to eliminate substantially all sliding normally tending to occur during dialing.

*Composition of an illustrative base pad*

| Element: | Parts by weight |
|---|---|
| Neoprene Type W | 100.00 |
| Magnesium oxide | 4.00 |
| Stearic acid | 0.50 |
| Iron oxide | 5.00 |
| EPC carbon black | 1.00 |
| 2 mercaptobenzothiazol, zinc salt | 5.00 |
| Nickel dibutyldithiocarbonate | 0.50 |
| Hard clay | 30.00 |
| Circo L. P. oil | 5.00 |
| 2 mercaptoimidazoline | 1.00 |

In addition to feet 5 being suitable in number, as described above, their distribution on the surface of pad 1 is also a significant factor in eliminating objectionable sliding. According to the invention, if the distribution of feet 5 is restricted to the marginal area of the pad, as depicted in one form by FIG. 1, sliding is reduced to a greater degree than if the feet were uniformly distributed over the entire surface of the pad. The improved frictional characteristic of a pad is explained by reference to FIG. 2 in conjunction with FIG. 1. FIG. 2 shows one embodiment of a light-weight telephone set in which the dialing mechanism includes a finger wheel 11 conveniently mounted in proximity to an inclined platform 12 disposed at an angle slightly oblique to the set's base. It will be appreciated that in dialing a subscriber will generally tend to exert a force on the set directed toward the perimeter of the set's base. This force, being at an angle to the surface upon which the set rests, comprises both vertical and horizontal components, the latter being those which induce objectionable sliding. By distributing feet 5 in the region pierced by the motive force, the vertical component is maximally applied to further compress the feet, thereby correspondingly increasing their coefficient of friction. In the event that an unusually large dialing force is exerted, feet 5 compensate by bending, somewhat, to allow their side walls to also come in contact with the surface upon which the set rests, thereby increasing the effective surface area of the feet. Such an arrangement has the added advantages that the pores or other irregularities inherently impregnated along the side walls of feet 5 are, under normal circumstances, compressively closed and not in direct contact with the dust collecting surface upon which the set rests. Consequently, these pores tend to remain free of foreign particles and retain their gripping properties for longer periods of time that might otherwise occur.

Also contributing significantly to the improved gripping qualities of the invention is the general shape into which the individual feet are formed. It has been observed that if a layer of dust is allowed to accumulate between a pair of otherwise abutting frictional surfaces, the relative coefficient of friction between such surfaces is noticeably decreased. In effect, the dust particles provide a multiplicity of tiny vehicles upon which the surfaces ride with respect to one another. The invention substantially overcomes this adverse decrease by virtue of the individual feet being shaped in the form of relatively thin studs which, as illustrated in FIG. 2, may be conveniently tapered into blunt points, each of which has only a small area bearing upon the surface supporting set 2. If the pad is composed of a suitable number of feet, as described above, each in the form of a thin stud, shear induced by the horizontal component of a dialing force will bite into, figuratively speaking, or, stated somewhat differently, plow a path through the aforementioned accumulated layer. As a consequence, the abutting frictional surfaces comprising the lower extremity of each of the feet and the table top or other surface supporting set 2 are brought to bear more directly against one another so as to yield a more tenacious bond than if these surfaces were separated by an intermediate layer of foreign matter.

In the embodiment of the invention depicted in FIG. 1, feet 5 are arranged in six concentric rows, the rows being offset from each other by approximately one half of the space between adjacent feet. It is to be emphasized, however, that the embodiment shown is merely illustrative, it being intended that the invention encompasses any generalized grouping in which the protrusions are solely distributed around the perimeter of the object to which a base pad is affixed.

Although only a single embodiment of the invention has been described herein, it is to be understood that this embodiment is only a convenient illustration of the invention and is in no way intended to limit the spirit and scope of the invention.

What is claimed is:

1. A base pad for a subscriber telephone set comprising a sheet member, a surface of said sheet member including a central area and a peripheral area, said peripheral area being distinctly defined by a plurality of concentric rows of protruding feet, each of said feet having a first extremity disposed on said peripheral area and a second extremity disposed in a plane displaced from said central area.

2. A base pad for a subscriber telephone set comprising a sheet member, a first surface of said sheet member including a relatively flat central area and a peripheral area having a plurality of concentric rows of protruding feet, each of said feet having a first extremity disposed on said peripheral area and a second extremity disposed in a plane displaced from said area, each of said feet being constructed of a resilient substance.

3. A base pad for a subscriber telephone set comprising a sheet member, a surface of said sheet member including a relatively flat central area and a peripheral area having a plurality of concentric rows of protruding neoprene feet, each of said feet having a first extremity molded to said peripheral area and a second extremity disposed in a plane substantially parallel to and displaced from said central area.

4. A neoprene base pad for a subscriber telephone set comprising a sheet member, a surface of said sheet member including a substantially flat central region and a peripheral region comprising a plurality of concentric rows of protruding truncated feet, a first extremity of each of said feet being affixed to said peripheral region and a second extremity of each of said feet being disposed collectively in a plane displaced from the plane of said central region.

5. A base pad for a subscriber telephone set comprising a sheet member, a surface of said sheet member including a central region having a substantially flat surface and a peripheral region having a multiplicity of protruding truncated feet clustered thereon in concentric rows, each of said feet having first and second extremities, said feet collectively having their first extremity molded to said peripheral region and their second extremity disposed in a common plane displaced from the surface of said central region.

6. In combination, a telephone set having a base member, a pad having a supporting surface affixed to said base member, said supporting surface comprising first and second coplanar surface regions, said first region being disposed in such manner as to substantially circumscribe said second region with a plurality of concentric rows of resilient truncated protrusions molded thereon.

7. In combination, a telephone set having a base member, a pad having a supporting surface affixed to said base member and disposed within the perimeter thereof, said supporting surface comprising first and second substantially flat surface regions, said first region being disposed in such manner as to substantially circumscribe said second region, and a plurality of feet protruding in concentric rows from said first region in such manner that said set is rendered capable of being supported on a plane surface solely by said feet.

8. In combination, a telephone set having a base member, a pad affixed to said base member and disposed within the perimeter thereof, said pad comprising first and second substantially flat surface regions, said first region occupying the marginal area of said pad and said second region occupying the central area of said pad, and a plurality of feet constructed of a resilient material protruding from said pad molded on said first region in concentric rows, whereby said set is rendered capable of being supported on a plane surface solely by said feet.

9. In combination, a telephone set having a base member, a neoprene pad having a supporting surface affixed to said base member and disposed within the perimeter thereof, said supporting surface comprising a marginal area from which protrude a plurality of concentric rows of truncated feet molded thereon and a substantially flat central area, said feet being of sufficient length so that said set is rendered capable of being supported on a plane surface solely by said feet.

10. In combination, a telephone set having a base member, a pad having a supporting surface affixed to said base member, said supporting surface comprising a substantially flat central area and a peripheral area having a multiplicity of protruding feet clustered thereon in concentric rows, each of said feet having first and second extremities, said feet collectively having their first extremities molded to said peripheral area and their second extremities disposed in a common plane displaced from the surface of said central area.

11. In combination, a telephone set having a base member, a pad having a supporting surface affixed to said base member, said supporting surface comprising a marginal band having a perimeter substantially coextensive with the perimeter of said base member, said marginal band having a multiplicity of feet clustered thereon in concentric rows in such manner that said set is rendered capable of being supported on a plane surface solely by said feet.

12. In combination, a tangible object having a base member at least a portion of which comprises a flat surface, a pad having a supporting surface affixed to said flat surface, said supporting surface comprising a peripheral band having a perimeter substantially coextensive with the perimeter of said flat surface, said marginal band having a multiplicity of truncated feet clustered thereon in concentric rows in such manner that said object is rendered capable of being supported on a plane surface solely by said feet.

References Cited by the Examiner

UNITED STATES PATENTS

| | | | |
|---|---|---|---|
| 1,890,000 | 12/32 | Oakley | 248—350 |
| 2,148,055 | 2/39 | Blumenthal | 248—350 |

FOREIGN PATENTS

| | | |
|---|---|---|
| 292,676 | 6/28 | Great Britain. |

ROBERT H. ROSE, *Primary Examiner.*

THOMAS B. HABECKER, *Examiner.*